(12) United States Patent
Zhang

(10) Patent No.: US 12,735,178 B2
(45) Date of Patent: Sep. 15, 2026

(54) HELICOPTER ROTOR HEAD STRUCTURE

(71) Applicant: Tibet Chuangbo General Aviation Technology Co., Ltd., Shannan (CN)

(72) Inventor: Bo Zhang, Shannan (CN)

(73) Assignee: Tibet Chuangbo General Aviation Technology Co., Ltd., Shannan (JP)

( * ) Notice: Subject to any disclaimer, the term of this patent is extended or adjusted under 35 U.S.C. 154(b) by 0 days.

(21) Appl. No.: 19/074,300

(22) Filed: Mar. 7, 2025

(65) Prior Publication Data

US 2025/0206444 A1 Jun. 26, 2025

(30) Foreign Application Priority Data

Jan. 16, 2025 (CN) ........................ 202510090026.8

(51) Int. Cl.
*B64C 27/48* (2006.01)
*B64C 27/605* (2006.01)
*B64C 27/72* (2006.01)

(52) U.S. Cl.
CPC ............ *B64C 27/48* (2013.01); *B64C 27/605* (2013.01); *B64C 27/72* (2013.01)

(58) Field of Classification Search
CPC ........ B64C 27/48; B64C 27/72; B64C 27/605
See application file for complete search history.

(56) References Cited

U.S. PATENT DOCUMENTS 3,007,530 A * 11/1961 Doman ................. B64C 27/605 416/102
3,207,226 A * 9/1965 Caldwell ................. B64C 27/12 475/329
4,131,391 A * 12/1978 Robinson ................ B64C 27/43 416/140
4,141,664 A * 2/1979 Moran .................... B64C 27/48 403/53
2010/0196161 A1 8/2010 Uebori et al.
2015/0321756 A1* 11/2015 Uebori .................... B64C 27/78 416/99
2016/0031557 A1* 2/2016 Bammer ............... B64C 27/605 416/109
2016/0090178 A1* 3/2016 Paynton ................ B64C 27/605 416/112
2018/0319489 A1* 11/2018 Laflamme ............... B64C 27/43
2020/0001992 A1* 1/2020 Wittke .................. B64C 27/605
2021/0354815 A1* 11/2021 Cravener ................ B64C 27/48
2022/0111959 A1* 4/2022 Chando ................... B64C 27/52
2022/0126990 A1 4/2022 Yang

* cited by examiner

*Primary Examiner* — Andrew J Marien

(57) ABSTRACT

A helicopter rotor head structure comprises a hub, a holder, a bearing and a pitch change mechanism. The hub is provided at the top of a main rotor mast. A connecting shaft is provided in the hub. An end of the connecting shaft extends to the outside of the hub and has the bearing sleeved thereon. The end of the holder facing away from a blade is sleeved on the bearing, and is rotationally connected to the connecting shaft. The bearing comprises an angular contact bearing, a thrust roller bearing and a deep groove ball bearing which are provided in sequence in the length of the connecting shaft. The pitch change mechanism is sleeved on the main rotor mast, and is connected to the holder.

9 Claims, 3 Drawing Sheets

HELICOPTER ROTOR HEAD STRUCTURE

CROSS-REFERENCE TO RELATED APPLICATIONS

This application claims priority to Chinese Patent Application No. CN 202510090026.8, filed on Jan. 16, 2025. The content of the aforementioned application, including any intervening amendments thereto, is incorporated herein by reference.

FIELD

The present disclosure relates to the technical field of parts of helicopters, and in particular, to a helicopter rotor head structure.

BACKGROUND

A fully articulated rotor system is a blade system in which blades are connected to a hub and which can flap, lag and change a pitch independently. The fully articulated rotor system allows a rotor pitch to be changed during flight. Such system is obviously much more complex than a seesaw-type rotor head and requires hinges that allow the rotor blades to flap, change a pitch, and lag independently. One of the main advantages of the fully articulated rotor system is that it allows for jump takeoff. To successfully achieve the jump takeoff, the rotor system must have the function of changing the collective pitch, blades with sufficient inertia and a pre-rotation system that can reach approximately 150% of a normal flight rotation speed. The rotor blades with high inertia are desirable in the helicopter design and necessary for jump takeoff of an autogyroplane.

The hub of the helicopter is the core component connecting the blades and a transmission system. For a metal fully articulated hub, since a thrust bearing in an axial hinge bears a centrifugal force generated by the rotation of the rotor, the damage to the thrust bearing will affect the realization of the function of the axial hinge and seriously affect the safety of the aircraft. Due to its own structural limitations, the existing fully articulated rotor system causes a thrust bearing collar and a retainer of the axial hinge to prone to break during use. Therefore, it is necessary to design a new rotor head structure to solve the technical problems hereinabove.

SUMMARY

In view of above, the present disclosure provides a helicopter rotor head structure to solve the problems hereinabove in the prior art.

In order to achieve the object hereinabove, the present disclosure provides the following technical solutions:

According to a first aspect of the present disclosure, a helicopter rotor head structure comprises a hub, a holder, a bearing and a pitch change mechanism. The hub is provided at the top of a main rotor mast. A connecting shaft is provided in the hub. An end of the connecting shaft extends to the outside of the hub and has the bearing sleeved thereon. The end of the holder facing away from a blade is sleeved on the bearing, and is rotationally connected to the connecting shaft;

the bearing comprises an angular contact bearing, a thrust roller bearing and a deep groove ball bearing which are provided in sequence in the length direction of the connecting shaft, and the deep groove ball bearing is provided near the end of the connecting shaft; and the pitch change mechanism is sleeved on the main rotor mast, and is connected to the holder.

Further, the connecting shaft is provided in a direction perpendicular to the axial direction of the hub, and both ends of the connecting shaft extend to the outside of the hub, and the bearing and the holder are provided at two ends of the connecting shaft respectively.

Further, a sleeve is provided at the end of the holder connected to the connecting shaft, an annular flange is provided on an inner wall of the sleeve and is located between the angular contact bearing and the thrust roller bearing when mounted, and two sides of the annular flange abut against the angular contact bearing and the thrust roller bearing respectively.

Further, the helicopter rotor head structure further comprises a sealing ring that is provided on the side of the deep groove ball bearing facing away from the thrust roller bearing.

Further, the helicopter rotor head structure further comprises a bolt and a washer, wherein a threaded hole is provided in the end of the connecting shaft, the washer is provided on the side of the deep groove ball bearing facing away from the thrust roller bearing, the washer is sleeved on the bolt and abuts against an inner ring of the deep groove ball bearing, and the bolt is in threaded connection to the threaded hole.

Further, the helicopter rotor head structure further comprises a retaining ring, wherein the retaining ring is sleeved on the connecting shaft, and abuts against the side of the angular contact bearing facing away from the thrust roller bearing.

Further, two clamp pieces are provided at the end of the holder connected to the blade, and are provided symmetrically with each other along the axis of the holder, and each of the clamp pieces is provided with a connecting hole.

Further, the clamp pieces and the sleeve are of an integral structure.

Further, the pitch change mechanism comprises a connecting seat and a pitch change tie rod, wherein the connecting seat is sleeved on the main rotor mast, one end of the pitch change tie rod is connected to the connecting seat, and the other end of the pitch change tie rod is connected to the holder; and the connecting seat is provided with a driving mechanism that is configured to drive the connecting seat to move up and down along the main rotor mast.

Further, the helicopter rotor head structure further comprises a rocker arm that is provided in the length direction of the holder, one end of the rocker arm being connected to the holder, and the other end of the rocker arm being connected to the end of the pitch change tie rod facing away from the connecting seat.

The present disclosure has the following advantages: the bearing comprises the angular contact bearing, the thrust roller bearing and the deep groove ball bearing; with the angular contact bearing, it can bear radial load and axial load at the same time, can better transmit a centrifugal force and a bending moment, and reduces the contact stress level of the bearing; with the thrust roller bearing, it can bear axial load and radial combined load with the axial load as the main load, and its axial load-bearing capacity is significant, which can significantly improve the axial load-bearing capacity; with the deep groove ball bearing, it can bear a large radial load, which can significantly improve the radial load-bearing capacity; the angular contact bearing, the thrust roller bearing and the deep groove ball bearing are used in combination, which significantly improves the axial and radial load-bearing capacities of the entire bearing, so that the bearing is not prone to damage and has a longer overall service life; and with the pitch change mechanism, the angle of the blade can be flexibly adjusted, thereby adjusting the lift and drag generated by the rotor.

BRIEF DESCRIPTION OF THE DRAWINGS

In order to illustrate the implementations of the present disclosure or the technical solutions in the prior art more clearly, the drawings required for describing the implementations or the prior art will be briefly introduced below. Apparently, the drawings described below are merely exemplary, and those of ordinary skill in the art may further derive other implementing drawings from the provided drawings without creative effort.

The structure, proportion, size, etc. illustrated in the description are used only for cooperating with the content disclosed in the description to facilitate understanding and reading by those skilled in the art, rather than limiting implementable specific conditions of the present disclosure, and therefore do not have technically substantive meanings. Any modification of the structure, change of the proportional relationship, or adjustment of the size, without affecting the effect and purpose achievable by the present disclosure, shall fall within the scope encompassed by the technical content disclosed in the present disclosure.

Figure 1:
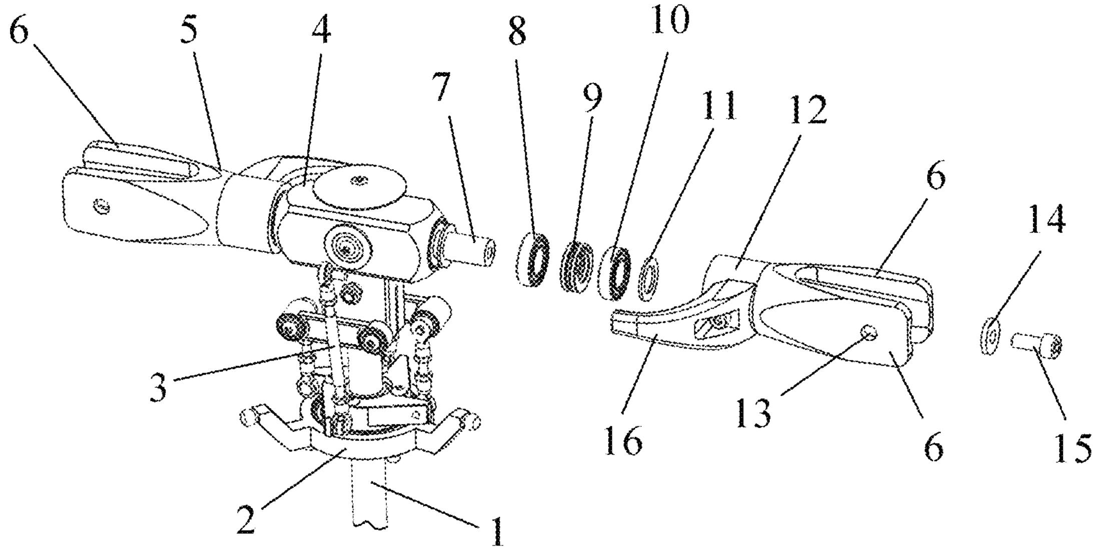
FIG. 1 is an exploded view of a helicopter rotor head structure according to some embodiments of the present disclosure.

In the drawings: 1. Main rotor mast, 2. Connecting seat, 3. Pitch change tie rod, 4. Hub, 5. Holder, 6. Clamp piece, 7. Connecting shaft, 8. Angular contact bearing, 9. Thrust roller bearing, 10. Deep groove ball bearing, 11. Sealing ring, 12. Sleeve, 13. Connecting hole, 14. Washer, 15. Bolt, 16. Rocker arm, 17. Annular flange, 18. Retaining ring.

DETAILED DESCRIPTION OF THE EMBODIMENTS

The implementations of the present disclosure are described below with specific embodiments, and those skilled in the art may readily understand other advantages and effects of the present disclosure based on the content disclosed in the description. Apparently, the described embodiments are some of, rather than all of, the embodiments of the present disclosure. All the other embodiments obtained by those of ordinary skill in the art based on the embodiments in the present disclosure without creative effort fall within the scope of protection of the present disclosure.

Embodiment 1

Figure 2:
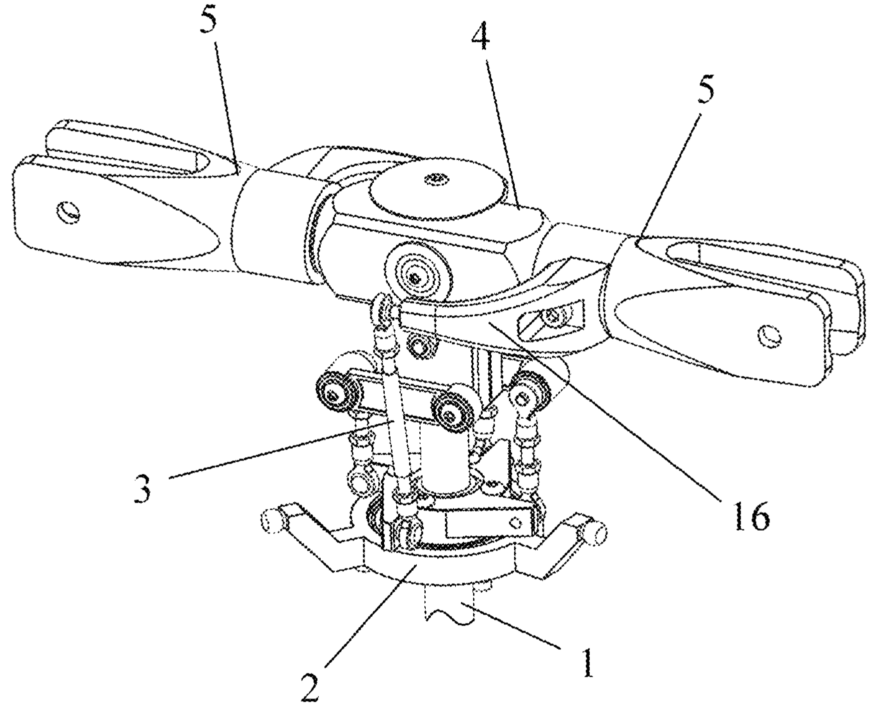
FIG. 2 is a perspective view of a helicopter rotor head structure according to some embodiments of the present disclosure.
Figure 3:
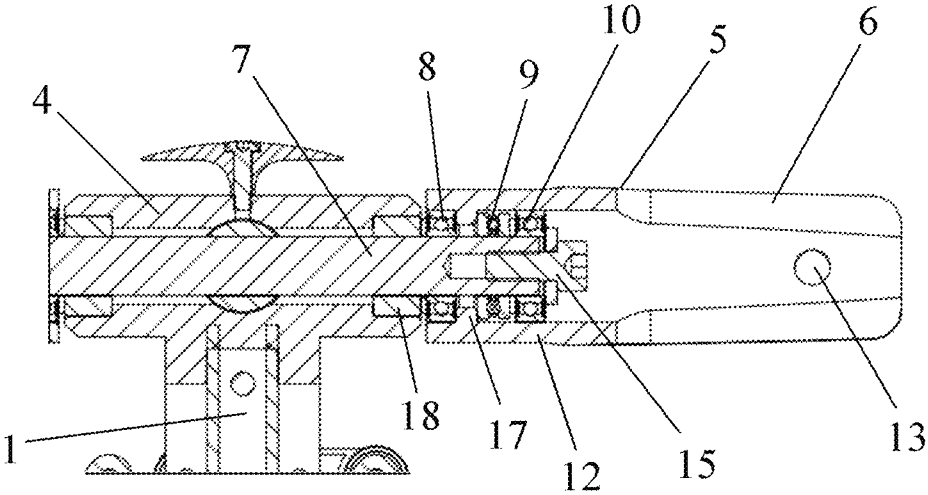
FIG. 3 is a partial cross-sectional view of a helicopter rotor head structure according to some embodiments of the present disclosure.

As shown in FIGS. 1-3, a helicopter rotor head structure in one embodiment of the first aspect of the present disclosure comprises a hub 4, a holder 5, a bearing and a pitch change mechanism. The hub 4 is provided at the top of the main rotor mast 1. A connecting shaft 7 is provided in the hub 4. An end of the connecting shaft 7 extends to the outside of the hub 4 and has the bearing sleeved thereon. The end of the holder 5 facing away from a blade is sleeved on the bearing, and is rotationally connected to the connecting shaft 7;

- the bearing comprises an angular contact bearing 8, a thrust roller bearing 9 and a deep groove ball bearing 10 which are provided in sequence in the length direction of the connecting shaft 7, and the deep groove ball bearing 10 is provided near the end of the connecting shaft 7; and
- the pitch change mechanism is sleeved on the main rotor mast 1, and is connected to the holder 5 and configured to adjust the angle of the blade.

In this embodiment, it should be noted that the connecting shaft 7 is provided in a direction perpendicular to the axial direction of the hub 4, and both ends of the connecting shaft 7 extend to the outside of the hub 4. The bearing and the holder 5 are provided at two ends of the connecting shaft 7 respectively. During use, each end of the connecting shaft 7 is connected to a blade through one holder 5.

The specific number of angular contact bearing 8, thrust roller bearing 9 and deep groove ball bearing 10 can be set to one or more according to actual use requirements. When there are multiple angular contact bearings, multiple thrust roller bearings and multiple deep groove ball bearings, the bearings of the same type are provided in a group.

This embodiment achieves the following technical effects: the bearing comprises the angular contact bearing 8, the thrust roller bearing 9 and the deep groove ball bearing 10; with the angular contact bearing 8, it can bear a radial load and an axial load at the same time, can better transmit a centrifugal force and a bending moment, and reduces the contact stress level of the bearing; with the thrust roller bearing 9, it can bear an axial load and radial combined load with the axial load as the main load, and its axial load-bearing capacity is significant, which can significantly improve the axial load-bearing capacity; with the deep groove ball bearing 10, it can bear a large radial load, which can significantly improve the radial load-bearing capacity; the angular contact bearing 8, the thrust roller bearing 9 and the deep groove ball bearing 10 are used in combination, which significantly improves the axial and radial load-bearing capacities of the entire bearing, so that the bearing is not prone to damage and has a longer overall service life; and with the pitch change mechanism, the pitch of the rotor can be flexibly adjusted, thereby adjusting the thrust of the rotor.

Embodiment 2

As shown in FIGS. 1-3, another helicopter rotor head structure according to this embodiment structurally comprises the entire content of Embodiment 1, and only different portions will be described below.

In this embodiment, a sleeve 12 is provided at the end of the holder 5 connected to the connecting shaft 7, and is provided with a through hole along its axial direction. The through hole is coaxial with the holder 5. An annular flange 17 is provided on an inner wall of the sleeve 12. The annular flange 17 and the sleeve are of an integral structure, and the annular flange 17 is annularly provided along the axis of the sleeve 12. When mounted, the annular flange 17 is located between the angular contact bearing 8 and the thrust roller bearing 9, and two sides of the annular flange 17 abut against the angular contact bearing 8 and the thrust roller bearing 9 respectively to exert support and limitation effects thereon.

In this embodiment, it should be noted that the helicopter rotor head structure further comprises a sealing ring 11 which is provided on the side of the deep groove ball bearing 10 facing away from the thrust roller bearing 9 and which is used to prevent lubricating oil from leaking from the bearing during use.

Further, two clamp pieces 6 are provided at the end of the holder 5 connected to the blade, and are provided symmetrically with each other along the axis of the holder 5. Each clamp piece 6 is provided with a connecting hole 13. The connecting holes 13 in the two clamp pieces 6 are coaxial. The connecting holes 13 are configured to mount a hinge shaft of the blade. The clamp piece 6 and the sleeve 12 are of an integral structure. When mounted, the blade passes through the connecting holes 13 via the hinge shaft and is then hinged to the holder.

This embodiment achieves the following technical effects: the holder 5 is simple in structure and easy to manufacture and mount, and after mounting, the holder can achieve a good effect of assembly with the connecting shaft 7 to ensure smooth transmission of a torque.

Embodiment 3

As shown in FIGS. 1-3, another helicopter rotor head structure according to this embodiment structurally comprises the entire content of Embodiment 2, and only different portions will be described below.

In this embodiment, the helicopter rotor head structure further comprises a bolt 15 and a washer 14. A threaded hole is provided at the end of the connecting shaft 7. The washer 14 is provided on the side of the deep groove ball bearing 10 facing away from the thrust roller bearing 9. The washer 14 is sleeved on the bolt 15 and abuts against an inner ring of the deep groove ball bearing 10. The bolt 15 is in threaded connection to the threaded hole.

In this embodiment, it should be noted that the helicopter rotor head structure further comprises a retaining ring 18. The retaining ring 18 is sleeved on the connecting shaft 7, and abuts against the side of the angular contact bearing 8 facing away from the thrust roller bearing 9. The retaining ring 18, the annular flange 17, the washer 14 and the bolt 15 are used in combination with each other to position and mount the angular contact bearing 8, the thrust roller bearing 9 and the deep groove ball bearing 10, and at the same time, to realize the mounting and fixation of the holder 5.

Embodiment 4

As shown in FIGS. 1-3, another helicopter rotor head structure according to this embodiment structurally comprises the entire content of Embodiment 3, and only different portions will be described below.

In this embodiment, the pitch change mechanism comprises a connecting seat 2 and a pitch change tie rod 3. The connecting seat 2 is sleeved on the main rotor mast 1. One end of the pitch change tie rod 3 is hinged to the connecting seat 2, and the other end of the pitch change tie rod 3 is hinged to the holder 5. The length of the pitch change tie rod 3 is adjustable; and the connecting seat 2 is provided with a driving mechanism that is configured to drive the connecting seat 2 to move up and down along the main rotor mast 1, and in particular, the driving mechanism may be a steering gear.

In this embodiment, it should be noted that the helicopter rotor head structure further comprises a rocker arm 16 that is provided in the length direction of the holder 5, one end of the rocker arm 16 being connected to the holder 5, and the other end of the rocker arm 16 being connected to the end of the pitch change tie rod 3 facing away from the connecting seat 2. In particular, the rocker arm 16 comprises a first branch arm and a second branch arm, wherein one end of the first branch arm is connected to one end of the second branch arm, and the first branch arm and the second branch arm are L-shaped and are of an integral structure. The end of the second branch arm facing away from the first branch arm is connected to the holder 5 through a bolt. The first branch arm is provided in a direction parallel to the axis of the holder 5. The end of the first branch arm facing away from the second branch arm is hinged to the end of the pitch change tie rod 3 facing away from the connecting seat 2;

when in use, by adjusting the length of the pitch change tie rod 3 or by moving the connecting seat 2 up and down to drive the pitch change tie rod to move, the rocker arm 16 can drive the holder 5 and the blade to rotate at a certain angle about the axis of the connecting shaft 7, thereby adjusting the angle of the blade to adjust the lift and drag generated by the rotor, thereby achieving stable and flexible flight.

This embodiment achieves the following technical effects: the pitch change mechanism is simple in structure and easy to use and operate, and can flexibly adjust the angle of the blade, thereby adjusting the lift and drag generated by the rotor.

Although the present disclosure has been described in detail above with general description and specific embodiments, some modifications or improvements can be made based on the present disclosure, which is apparent to those skilled in the art. Therefore, such modifications or improvements made without departing from the spirit of the present disclosure fall within the scope of protection of the present disclosure.

The terms such as "upper", "lower", "left", "right", and "middle" referenced in the description are merely for the convenience of clear description, and are not intended to limit the implementable scope of the present disclosure. The change or adjustment of their relative relationship shall also fall within the implementable scope of the present disclosure in the absence of substantial changes of the technical content.

What is claimed is:

1. A helicopter rotor head structure, comprising a hub (4), a holder (5), a bearing and a pitch change mechanism, wherein the hub (4) is provided at a top of a main rotor mast (1), a connecting shaft (7) is provided in the hub (4), an end of the connecting shaft (7) extends to an outside of the hub (4) and has the bearing sleeved thereon, and an end of the holder (5) facing away from a blade is sleeved on the bearing, and is rotationally connected to the connecting shaft (7);

the bearing comprises an angular contact bearing (8), a thrust roller bearing (9) and a deep groove ball bearing (10) which are provided in sequence in a length direction of the connecting shaft (7), and the deep groove ball bearing (10) is provided near the end of the connecting shaft (7); and the pitch change mechanism is sleeved on the main rotor mast (1), and is connected to the holder (5), wherein a sleeve (12) is provided at the end of the holder (5) connected to the connecting shaft (7), an annular flange (17) is provided on an inner wall of the sleeve (12) and is located between the angular contact bearing (8) and the thrust roller bearing (9) when mounted, and two sides of the annular flange (17) abut against the angular contact bearing (8) and the thrust roller bearing (9) respectively.

2. The helicopter rotor head structure according to claim 1, wherein the connecting shaft (7) is provided in a direction perpendicular to an axial direction of the hub (4), and both ends of the connecting shaft (7) extend to the outside of the hub (4), and the bearing and the holder (5) are provided at two ends of the connecting shaft (7) respectively.

3. The helicopter rotor head structure according to claim 1, further comprising a sealing ring (11) that is provided on a side of the deep groove ball bearing (10) facing away from the thrust roller bearing (9).

4. The helicopter rotor head structure according to claim 1, further comprising a bolt (15) and a washer (14), wherein a threaded hole is provided in the end of the connecting shaft (7), the washer (14) is provided on the side of the deep groove ball bearing (10) facing away from the thrust roller bearing (9), the washer (14) is sleeved on the bolt (15) and abuts against an inner ring of the deep groove ball bearing (10), and the bolt (15) is in threaded connection to the threaded hole.

5. The helicopter rotor head structure according to claim 1, further comprising a retaining ring (18), wherein the retaining ring (18) is sleeved on the connecting shaft (7), and abuts against a side of the angular contact bearing (8) facing away from the thrust roller bearing (9).

6. The helicopter rotor head structure according to claim 1, wherein two clamp pieces (6) are provided at the end of the holder (5) connected to the blade, and are provided symmetrically with each other along an axis of the holder (5), and each of the clamp pieces (6) is provided with a connecting hole (13).

7. The helicopter rotor head structure according to claim 6, wherein the clamp pieces (6) and the sleeve (12) are of an integral structure.

8. The helicopter rotor head structure according to claim 1, wherein the pitch change mechanism comprises a connecting seat (2) and a pitch change tie rod (3), wherein the connecting seat (2) is sleeved on the main rotor mast (1), one end of the pitch change tie rod (3) is connected to the connecting seat (2), and the other end of the pitch change tie rod (3) is connected to the holder (5); and the connecting seat (2) is provided with a driving mechanism that is configured to drive the connecting seat (2) to move up and down along the main rotor mast (1).

9. The helicopter rotor head structure according to claim 8, further comprising a rocker arm (16) that is provided in a length direction of the holder (5), one end of the rocker arm (16) being connected to the holder (5), and the other end of the rocker arm (16) being connected to the end of the pitch change tie rod (3) facing away from the connecting seat (2).

* * * * *